Jan. 9, 1951     W. H. KLIEVER     2,537,932
LINEAR FORCE BALANCE ANGLE OF ATTACK SENSING DEVICE
Filed Oct. 11, 1948
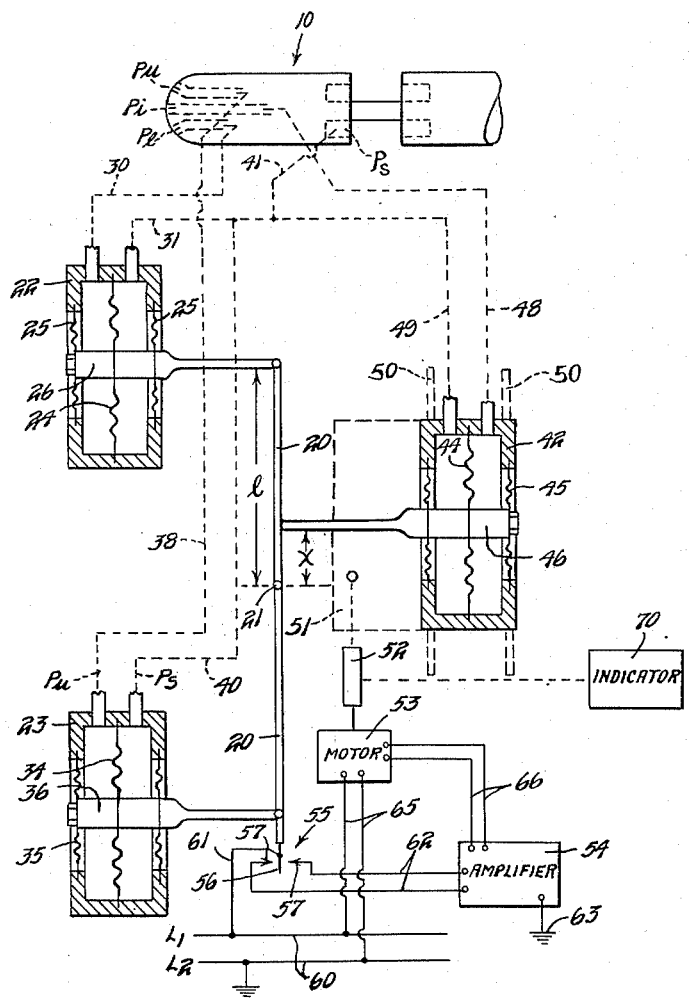
INVENTOR.
WALDO H. KLIEVER
BY
George H. Fisher
ATTORNEY Patented Jan. 9, 1951

2,537,932

UNITED STATES PATENT OFFICE 2,537,932

LINEAR FORCE BALANCE ANGLE OF ATTACK SENSING DEVICE

Waldo H. Kliever, Minneapolis, Minn., assignor to Minneapolis-Honeywell Regulator Company, Minneapolis, Minn., a corporation of Delaware Application October 11, 1948, Serial No. 53,834

9 Claims. (Cl. 73—180)

This invention relates to an angle of attack indicating apparatus, and more particularly to an angle of attack indicator using a pressure orifice sensing head and a linear force balance system to resolve the sensed pressures into values of angle of attack. It is therefore an object of this invention to provide in an angle of attack indicator a force balance system for measuring the angle of attack.

It is also an object of this invention to provide an improved angle of attack indicator.

Another object of this invention is to provide a simple and accurate method of measuring angle of attack of an aircraft.

It is further an object of this invention to provide an angle of attack indicator which is calibrated for all airspeeds.

These and other objects will readily become apparent as the following specification is read in the light of the accompanying drawing which is a schematic view of the indicator.

This angle of attack indicator or controlling apparatus includes a sensing head generally indicated at 10 which head combines the conventional Pitot static tube having impact $P_i$ and static $P_s$ pressure orifices with angle of attack sensing orifices $P_u$ and $P_l$ located above and below the impact pressure orifice $P_i$. The sensing head is conventionally known as a Prandtl tube commonly used in the orifice type measurement of angle of attack.

With this type of sensing head, the value of the angle of attack is obtained from the equation $$\frac{P_l - P_u}{P} = K\alpha$$

wherein $P_l$ is the pressure at the lower angle of attack orifice, $P_u$ is the pressure at the upper angle of attack orifice, $P$ is the difference between the pressures at the impact and the static pressure orifices, $K$ is the constant which describes the angular relationship or displacement of the side or angle orifices from the impact orifice and $\alpha$ is the value of angle of attack. Angle of attack for such a device is described as the angle between the center line of the sensing head and a line describing direction of the relative movement of air flow across or around said head. This equation is herein converted into a force or moment balance system by using a moment arm of a constant length through which the angle of attack pressures or forces are applied. Since each of these pressures are compensated for by the same counter pressure, that is static pressure, the equation will not be disturbed. Under such an arrangement a moment balance equation is obtained which is as follows: $l(P_l - P_u) = (P_i - P_s)x$ wherein $l$ is the length of the moment arm or the distance between the point of application of the angle of attack pressures and the pivot point and $x$ is the moment arm for the balancing force. This equation can be resolved to $$\frac{P_l - P_u}{P_i - P_s} = \frac{x}{l}$$

Since $$\frac{P_l - P_u}{P_i - P_s} = K\alpha$$

the equation can be resolved to $$\frac{x}{l} = K\alpha$$

or $$\alpha = K\frac{x}{l}$$

In this equation, $x$ is the variable and is the value which controls the indicator to give an indication of angle of attack.

This force or moment balance system which is schematically shown in the drawing includes a lever member 20 pivoted at 21, which has moment arms of equal length $l$ to either side of the pivot point 21. The pivoted lever 20 is subjected at its extremities to forces obtained from a pair of pressure responsive devices 22, 23, such as a bellows, which respond to the angle of attack pressures. The bellows or pressure responsive device 22 is an enclosed chamber having a centrally located diaphragm 24 and a pair of sealing diaphragms 25 to which are attached an actuating rod 26. Diaphragm 24 divides the chamber into two airtight sections one of which is subjected to the pressure from the lower angle of attack sensing orifice $P_u$ through a tube 30 and the other side of which is subjected to the pressure of the static pressure orifice $P_s$ through a tube 31. The actuating rod 26 is connected at the mid points of the diaphragms 24 and 25 and extends to attach to and be pivoted on one extremity of lever 20.

Similarly pressure responsive device or bellows 23 includes the same structure as bellows 22 having a main diaphragm 34, sealing diaphragms 35 and an actuating lever 36. Diaphragm 34 divides the enclosed chamber of pressure responsive device 23 into two portions one side of which is subjected to pressure from the upper angle of attack orifice $P_l$ through a tube 38 and the other side of which is subjected to static pressure through a tube 40 which connects with a tube 41 to the static pressure orifice. The actuating rod 36 is attached to the diaphragms 34, 35 at their mid points and extend through to attach to and be pivoted on the opposite extremity of lever 20.

The pivoted lever 20 and the force balance system is further subjected to another force, known as a rebalancing force. This force is supplied by a pressure responsive device or bellows 42 which is subjected to the pressures from the impact and static pressure orifices. Bellows 42 is similarly an inclosed chamber having a centrally located main diaphragm 44 with a pair of sealing diaphragms 45 and an actuating rod 46 attached at the mid points of the diaphragms 44, 45. The main and sealing diaphragms 44, 45 respectively divide the chamber of the bellows 44 into two portions, one of which is subjected to impact pressure through a tube 48 leading to the impact pressure orifice and the other portion which is subjected to static pressure through a tube 49 leading to the tube 41 of the static pressure orifice.

Bellows 42 is mounted on a pair of guides 50, shown dotted in the drawing, which permits the bellows to be moved substantially parallel to the lever 20 for the purpose of varying the moment arm through which the rebalancing force of rod 46 is applied to the system. The bellows is secured to a plate or mounting 51, also shown dotted in the drawing, which is driven through a connection with a suitable transverse driving apparatus 52, this apparatus being powered by a motor 53. The plate 51 and hence the bellows 42 is moved along the guides 50 such that the rod 46 engages lever 20 at various points along its length and at either side of the pivot to direct the rebalancing force through a variable moment arm sufficient to balance the system. This moment arm is indicated as the variable length $x$ in the drawing and this quantity is proportional to the angle of attack. The motor 53 as shown in the drawing may be energized through an amplifier 54 which in turn is controlled by contact apparatus 55 or any equivalent control device which is actuated by the movement of lever 20. The lever 20 at one extremity carries a movable contact member 56 which is adapted to engage one or the other of a pair of stationary contact members 57. The contact apparatus 55 connects an energizing power surce 60 to the amplifier which in turn energizes the motor under the condition of unbalance. Source 60 is evidenced by a pair of conductors shown schematically as L1 and L2, of which L2 is grounded and L1 is connected by conductor 61 to the movable contact 56 of the contact apparatus 55. The stationary contacts 57 of the contact apparatus are connected by conductors 62 to the amplifier 54 which in turn is grounded at 63 to complete the energizing circuit. These circuits are shown schematically and the details of the amplifier are omitted for simplicity since those details form no part of this invention. It is to be understood that the contact apparatus controls the energization of the amplifier such that its output will vary in phase and hence energize the motor for operation in one direction of rotation or the other. Motor 53 is also shown as energized directly from the source 60 of L1 and L2 through conductors 65. Although the details of motor 53 are of no importance to the present invention, the motor may be a two phase induction motor, one phase of which is directly energized from the line source as by conductor 65 and the other phase of which is energized from an amplifier as through conductor 66 connecting motor 53 with amplifier 54. It should be kept in mind that any type of reversible motor electrical or otherwise could be used to position the arm 51 which motor could be controlled through the operation of the contact mechanism or similar control device. Similarly amplifier 54 may be omitted if the motor or driving device does not require such a unit.

Operatively connected to the gearing 52 is an indicator shown schematically at 70 which indicator would indicate angle of attack in proportion to the moment arm $x$ of the force balance system. The indicator 70, shown schematically, can also be used as a stall warning device in that a visual portion of its scale may be marked as a condition of impending stall condition. The apparatus could also be readily used for controlling angle of attack in that the mechanical displacement of the gearing 52 could readily effect a controlling or warning function.

In operation, this angle of attack indicator responds to the pressure sensed or admitted at the pressure orifices $P_u$ and $P_l$ to vary the forces applied to the moment arms or portions of lever 20 on either side of the pivot 21. It should be kept in mind that these angle of attack pressures vary not only with the direction of the airflow relative to the sensing device but also vary in proportion to the velocity of the air over the device. The bellows 42 is accordingly effective to apply a further moment to lever 20, which moment is dependent upon air speed and the distance $x$. As angle of attack of the sensing device is varied, as for example the change in attitude of an aircraft upon which it would be mounted, the force balance system is unbalanced and the contact apparatus 55 is actuated such that movable contact 56 engages one or the other of the stationary contacts 57. Amplifier 54 is thereby energized and the motor 53 is caused to rotate dependent upon the energization or the output of the amplifier. Movement of the motor 53 changes the point of application of the force from the pressure bellows 42 which responds to impact and static pressures. As the moment arm for this force is varied, a condition of balance will again be obtained and the lever 20 of the force balance system will be positioned such that the contact apparatus will no longer be engaged thereby deenergizing the motor and amplifier. The change in position of the moment arm 50 which applies the rebalancing force to the system will be indicated at the indicator 70 as a change in angle of attack.

In considering this invention it should be kept in mind that the present disclosure is intended to be illustrative only and the scope of the invention is to be determined only by the appended claims.

I claim:

1. An angle of attack indicating apparatus for aircraft comprising a sensing head having impact and static pressure orifices and a pair of angle of attack sensing orifices, a first pressure responsive means responsive to the difference between one of said attack angle pressures and said static pressure, a second pressure responsive means responsive to the difference between the other of said attack angle pressures and said static pressure, a lever pivoted at its mid point and having its extremities actuated by responses from said first and second pressure responsive means, a third pressure responsive means responsive to the difference between impact and static pressures, means including a motor means for directing the response of said third pressure responsive means on said lever and at a variable distance to either side of said pivot depending upon the operation of said motor means, contact means mounted on and actuated by said lever and adapted to control the energization of said motor means from an electrical source, and means for indicating the distance between the point of the response of said third pressure responsive means and said pivot.

2. An angle of attack indicating and controlling apparatus for aircraft comprising, a sensing head having impact and static pressure orifices and a pair of angle of attack sensing orifices from which such pressures are obtained, a first means actuated by the pressure difference between one of said angle of attack pressures and said static pressure and converting said pressure difference into a force, a second means actuated by the pressure difference between the other of said angle of attack pressures and said static pressure and converting said pressure difference into a force, a pivoted lever balance, means for applying said first and second named forces to said pivoted lever balance at opposite sides from said pivot, means actuated by the pressure difference between said impact and static pressures and converting said pressure differences into a force, means for applying said last named force to said pivoted lever balance to effect a balance of the same, means including a motor means for varying the point of application of said last named force with respect to said pivot, a controlling mechanism for controlling said motor means, and means for converting the distance between the point and application of said last named force of said pivot into a signal proportional to angle of attack.

3. An angle of attack indicating and controlling apparatus for aircraft comprising, a sensing head having orifices to sense impact, static and angle of attack pressures, a force balance system actuated by forces created by the pressures from said sensing head and including a pivoted lever member, means including a bellows for subjecting a portion of said lever member at one side of said pivot to a force created by the pressure difference between one of said angle of attack pressures and said static pressure, means including a second bellows for subjecting a second portion of said lever member at the opposite side of said pivot to a force created by the pressure difference between another of said angle of attack pressures and said static pressure, and means including a third bellows responsive to the pressure difference between impact and static pressures for creating a rebalancing force for said system, means for applying said rebalancing force at variable points along one or the other of said portions of said lever member, contact means controlled by a condition of unbalance of said lever member for controlling said balancing force applying means, and means responsive to displacement of said balancing force applying means along said lever member to indicate angle of attack.

4. An angle of attack indicating and controlling apparatus for aircraft comprising, a sensing head having impact and angle of attack sensing orifices and an orifice for reference pressure, a force balance system actuated by forces created by the pressures from said sensing head and including a pivoted lever member, means pivoting said lever member at a point midway along its extent, means responsive to the pressure difference between one of said angle of attack pressures and said reference pressure for creating a force on said lever member at a point a fixed distance from said pivot means, means responsive to the pressure difference between the other of said angle of attack pressures and said reference pressure for creating a force on said lever member at a point the same fixed distance from said pivot in the opposite direction, means responsive to the pressure difference between the impact pressure and said reference pressure for creating a balancing force on said lever member, motor means for varying the point of application of said balancing force on said lever member, control means responsive to a condition of unbalance of said lever member for controlling said motor means, and means for indicating the distance between the point of application of said last named force and said pivot.

5. An angle of attack indicating and controlling apparatus for aircraft comprising, a sensing head having impact and static pressure orifices and a pair of angle of attack sensing orifices located vertically above and below said impact pressure orifice, a force balance system actuated by forces created by the pressures from said sensing head and including a pivoted lever member, means pivoting said lever member at its mid point, a first pressure bellows means responsive to the pressures from one of said angle of attack sensing orifices and said static pressure orifice to provide a force applied to one extremity of said lever member, a second pressure bellows means responsive to the pressure from the other of said angle of attack sensing orifices and the pressure from said static pressure orifice to provide a force applied to the opposite extremity of said lever member, a third pressure bellows means responsive to the pressures from said impact pressure orifice and from said static pressure orifice to provide a force adapted to be applied to said lever member at variable points along its extent to either side of said pivot, means including a motor means for varying the point of application of said last named force, control means mounted on said lever member and operated under a condition of rotation of said lever member for controlling said motor means, and means actuated by said motor means for indicating the distance between the point of application of said last named force and said pivot which distance is proportional to angle of attack.

6. An angle of attack indicating apparatus for aircraft comprising a sensing head having orifices to admit impact and angle of attack pressures and a reference pressure, a force balance system actuated by forces created by said pressures from said sensing head and including a pivoted lever member, means for applying a moment of force in one direction to said pivoted lever member which moment is proportional to one of the angle of attack pressures compensated by said reference pressure, means for applying a second moment of force to said pivoted lever member in an opposite direction from said first named moment of force which moment is proportional to another of said angle of attack pressures compensated by said reference pressure, means for applying a balancing moment of force to said lever member which moment is proportional to impact pressure compensated by said reference pressure, and means for varying the magnitude of said balancing moment of force by adjusting its moment arm, said last named means being responsive to a condition of unbalance of said system, said moment arm being proportional to the angle of attack of said aircraft.

7. An angle of attack indicating apparatus for aircraft comprising a sensing head having orifices through which impact and static and angle of attack pressures are sensed, a force balance system actuated by forces derived from said pressures from said sensing head and including a pivoted lever member to which moments of force are applied, pressure responsive means responsive to the difference between one of said angle of attack pressures and said static pressure and providing a first force, means for applying said first force to said lever member through a moment arm of a given length and in a given direction about said pivot to give a first moment of force, a second pressure responsive means responsive to the difference between another of the angle of attack pressures and said static pressure to give a second force, means for applying said second force to said lever member through a moment arm of the same length as said first named moment arm and in a direction of rotation opposite said first named moment of force about the pivot to give a second moment of force, a third pressure responsive means responsive to the difference between impact and static pressures to give a third force, means applying said third force to said lever member through a variable moment arm and in a variable direction and providing a balancing moment of force, and means including control means operated by said pivoted lever member for controlling the length of said variable moment arm and the direction of rotation of said balancing moment of force, said variable moment arm being proportional to the angle of attack of the aircraft.

8. A device for indicating the angle of movement of an aircraft with respect to the surrounding air including an indicator, a pivotally mounted member, means including bellows means responsive to the relative values of the pressures at two angularly spaced points, said means being attached to said pivotally mounted member to exert a turning moment on said member about its pivot, means including a second bellows means responsive to air speed, said last named means being mounted adjacent said pivotally mounted member and adapted to be variably positioned along said pivotally mounted member for exerting an opposing moment on said member, rebalancing means connected to said air speed responsive means for varying its position to vary the amount of said opposing moment until said turning and opposing moments balance each other, control means responsive to a condition of rotation of said pivotally mounted member for controlling said rebalancing means, and means connecting said rebalancing means to said indicator to position the latter in accordance with the variation in said opposing moment required to balance said pivotally mounted member.

9. A device for indicating the angle of movement of an aircraft with respect to the surrounding air including an indicator, a pivotally mounted member, means including a first bellows means responsive to the relative values of pressures at two angularly spaced points and adapted to operatively engage said pivoted member to exert a turning moment on said member about its pivot, means including a second bellows means responsive to air speed and adapted to operatively engage said pivoted member at varying positions along its extent to exert an opposing moment on said member, means connected to said air speed responsive means to vary its position thereby applying said opposing moment through a variable moment arm, control means operated by said pivoted member to control the operation of said position varying means, and means connecting said position varying means to said indicator to position the latter in accordance with the variation on said moment arm required to balance said moments.

WALDO H. KLIEVER.

REFERENCES CITED

The following references are of record in the file of this patent:

UNITED STATES PATENTS

| Number | Name | Date |
|---|---|---|
| 2,237,306 | Hood | Apr. 8, 1941 |
| 2,463,585 | Young | Mar. 8, 1949 |

FOREIGN PATENTS

| Number | Country | Date |
|---|---|---|
| 575,008 | Great Britain | Jan. 30, 1946 |

Certificate of Correction

Patent No. 2,537,932 January 9, 1951

WALDO H. KLIEVER

It is hereby certified that error appears in the printed specification of the above numbered patent requiring correction as follows:

Column 5, line 37, for the words "point and" read *point of*; line 38, for "of said" read *and said*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*